United States Patent
Tanaka et al.

(10) Patent No.: US 11,126,072 B2
(45) Date of Patent: Sep. 21, 2021

(54) PHOSPHOR WHEEL INCLUDING A LIGHT ABSORPTION PROCESSING BODY PROVIDED IN A LIGHT PROCESSING REGION, LIGHT SOURCE DEVICE INCLUDING THE PHOSPHOR WHEEL, AND PROJECTION DISPLAY APPARATUS INCLUDING THE PHOSPHOR WHEEL

(71) Applicant: Panasonic Intellectual Property Management Co., Ltd., Osaka (JP)

(72) Inventors: Yoshiki Tanaka, Kyoto (JP); Manabu Okuno, Osaka (JP); Takashi Ikeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/386,908

(22) Filed: Apr. 17, 2019

(65) Prior Publication Data
US 2019/0331992 A1    Oct. 31, 2019

(30) Foreign Application Priority Data
Apr. 27, 2018 (JP) .............................. JP2018-085908

(51) Int. Cl.
   *G02B 21/20* (2006.01)
   *G03B 21/20* (2006.01)
   *G03B 21/00* (2006.01)

(52) U.S. Cl.
   CPC ....... *G03B 21/204* (2013.01); *G03B 21/2066* (2013.01); *G03B 21/008* (2013.01)

(58) Field of Classification Search
   CPC ............... G03B 21/204; G03B 21/008; G03B 21/2066; G03B 33/08
   See application file for complete search history.

(56) References Cited

U.S. PATENT DOCUMENTS

| | | | | |
|---|---|---|---|---|
| 9,291,332 B2 * | 3/2016 | Masuda | ................ | F21V 9/00 |
| 9,581,887 B2 * | 2/2017 | Tajiri | .................... | G03B 21/28 |
| 9,781,394 B2 * | 10/2017 | Hartwig | .............. | H04N 9/3161 |
| 9,869,856 B2 * | 1/2018 | Inoue | ................. | G03B 21/2013 |
| 10,061,188 B2 * | 8/2018 | Wang | .................... | G03B 21/16 |
| 2010/0328632 A1 * | 12/2010 | Kurosaki | ............. | G03B 21/204 353/98 |
| 2012/0300178 A1 * | 11/2012 | Sugiyama | ............ | H04N 9/3111 353/31 |
| 2013/0242273 A1 * | 9/2013 | Weichmann | ......... | G02B 26/008 353/84 |
| 2014/0022512 A1 * | 1/2014 | Li | ............................ | G02B 5/12 313/498 |
| 2014/0078168 A1 * | 3/2014 | Masuda | .................... | F21V 9/00 345/589 |

(Continued)

FOREIGN PATENT DOCUMENTS

| | | |
|---|---|---|
| JP | 2011-170362 | 9/2011 |
| JP | 2012-203344 | 10/2012 |

(Continued)

*Primary Examiner* — Bao-Luan Q Le
(74) *Attorney, Agent, or Firm* — Wenderoth, Lind & Ponack, L.L.P.

(57) ABSTRACT

A phosphor wheel of exemplary embodiment in the present disclosure includes a substrate, a phosphor region circularly provided on one surface of the substrate, a light processing region circularly provided on an other surface of the substrate and entered by incident light, a light processing body provided in the light processing region, a light-transmissive region provided in the substrate, and a drive device rotating the substrate.

2 Claims, 7 Drawing Sheets

(56) References Cited

U.S. PATENT DOCUMENTS

| | | | |
|---|---|---|---|
| 2014/0285774 A1* | 9/2014 | Tajiri | G03B 21/28 353/38 |
| 2015/0204517 A1* | 7/2015 | Arakawa | G03B 21/204 353/84 |
| 2016/0065919 A1* | 3/2016 | Miyata | G02B 26/008 353/31 |
| 2016/0165194 A1* | 6/2016 | Hartwig | H04N 9/3111 353/31 |
| 2016/0170199 A1* | 6/2016 | Inoue | G03B 21/14 348/761 |
| 2016/0173837 A1* | 6/2016 | Miyata | H04N 9/3161 353/31 |
| 2016/0238922 A1* | 8/2016 | Furuyama | G02B 26/008 |
| 2016/0349606 A1* | 12/2016 | Nishimori | G02B 26/008 |
| 2016/0377967 A1* | 12/2016 | Ando | G02B 26/008 362/84 |
| 2016/0377969 A1* | 12/2016 | Nishimori | F21V 23/003 362/259 |
| 2017/0227176 A1* | 8/2017 | Inoue | F21V 29/74 |
| 2017/0293212 A1* | 10/2017 | Wang | G03B 21/16 |
| 2018/0051865 A1* | 2/2018 | Cui | G03B 33/08 |
| 2018/0259158 A1* | 9/2018 | Cui | H04N 9/3158 |

FOREIGN PATENT DOCUMENTS

| | | |
|---|---|---|
| JP | 2014-186080 | 10/2014 |
| WO | 2014/109333 | 7/2014 |

\* cited by examiner

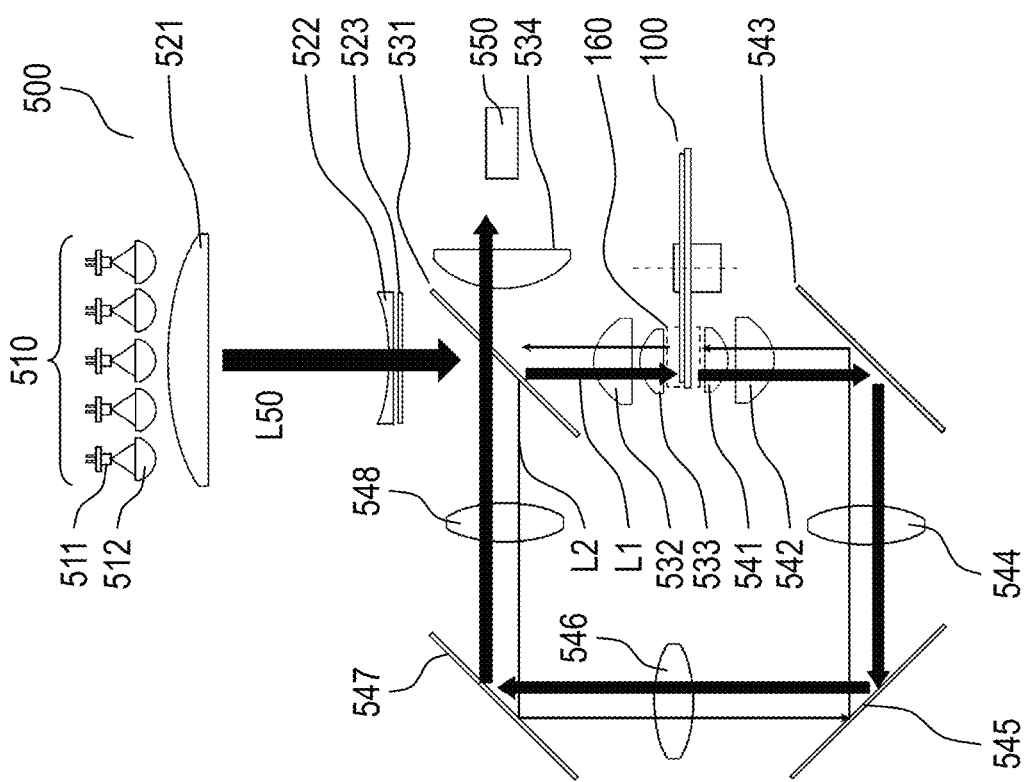
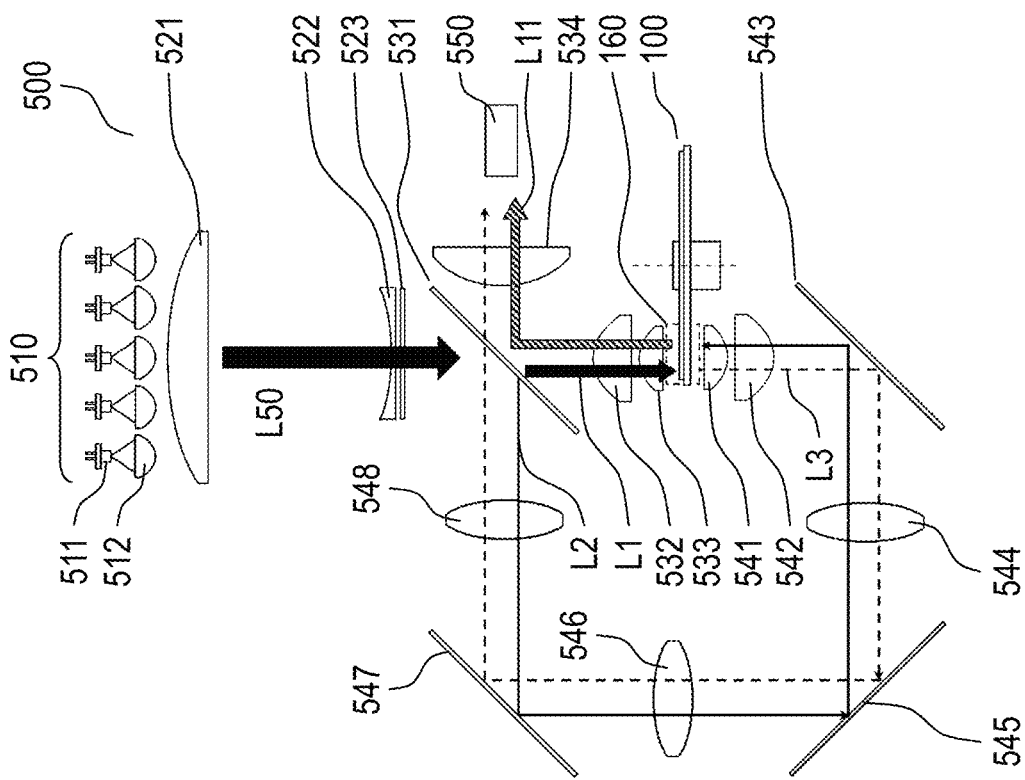

PHOSPHOR WHEEL INCLUDING A LIGHT ABSORPTION PROCESSING BODY PROVIDED IN A LIGHT PROCESSING REGION, LIGHT SOURCE DEVICE INCLUDING THE PHOSPHOR WHEEL, AND PROJECTION DISPLAY APPARATUS INCLUDING THE PHOSPHOR WHEEL

TECHNICAL FIELD

The present disclosure relates to a projection display apparatus using a light source device including an excitation light source that emits blue excitation light and a phosphor that emits light in response to the excitation light.

BACKGROUND

The projection display apparatus using a light source device including a light source that emits blue light and a phosphor wheel is disclosed in Patent Literature (Unexamined Japanese Patent Publication No. 2011-170362). This projection display apparatus includes a light guide optical system for emitting fluorescence and blue light with their optical paths and directions identical. This light guide optical system, having a dichroic mirror separating blue light from fluorescence between the phosphor wheel and the excitation light source, is configured to repeatedly reflect blue light that has passed through the blue region of the phosphor wheel by means of three mirrors to return the blue light to this dichroic mirror.

SUMMARY

Problems to be Solved by the Invention

The present disclosure provides a light source device using a phosphor wheel that is capable of reducing mixture of blue light into fluorescence and of emitting colors with high color purity, and a projection display apparatus including the light source device.

Means to Solve the Problems

A phosphor wheel of the present disclosure includes a substrate, a phosphor region circularly provided on one surface of the substrate, a light processing region circularly provided on the other surface of the substrate (incident light enters the light processing region), a light processing body provided in the light processing region, a light-transmissive region provided in the substrate, and a drive device rotating the substrate.

Advantage of the Invention

A light source device using a phosphor wheel of the present disclosure improves the chromaticity of red light and green light displayed by a projection display apparatus.

BRIEF DESCRIPTION OF DRAWINGS

FIG. 5A illustrates the configuration of a light source device according to the fifth exemplary embodiment.

FIG. 5B illustrates the configuration of the light source device according to the fifth exemplary embodiment.

DESCRIPTION OF EMBODIMENTS

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the accompanying drawings and the following description are provided for those skilled in the art to well understand the disclosure, and it is not intended that the drawings and the description limit the subjects described in the claims.

Here, one surface of a phosphor wheel is referred to as a front surface; the other surface, a back surface.

First Exemplary Embodiment

Phosphor Wheel

Hereinafter, a description is made of the configuration of a phosphor wheel according to this embodiment using FIG. 1.

Figure 1:
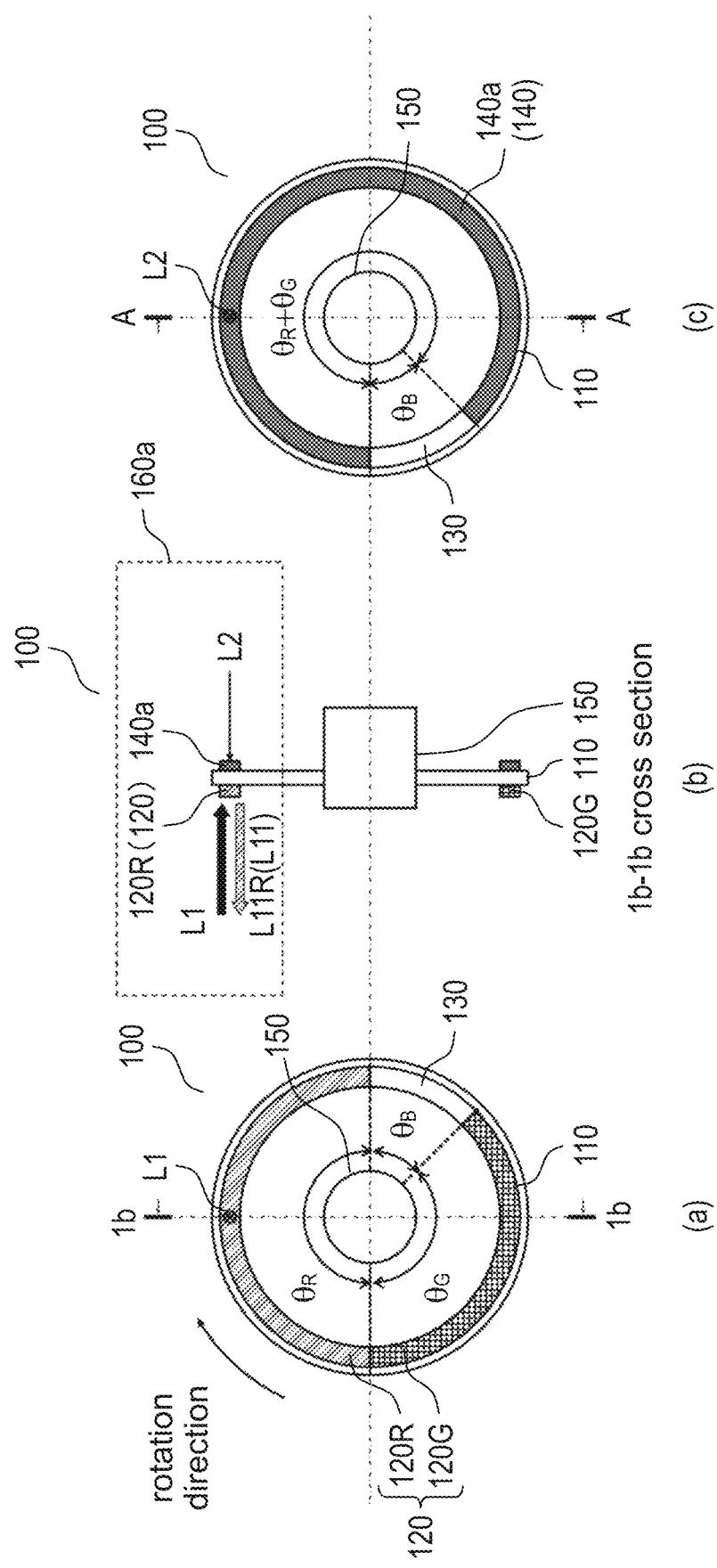
FIG. 1 illustrates a phosphor wheel according to the first exemplary embodiment.

FIG. 1 illustrates the configuration of phosphor wheel 100 according to the embodiment. FIG. 1(*a*) illustrates the front surface of phosphor wheel 100. FIG. 1(*b*) is a sectional view of phosphor wheel 100 taken along line 1*b*-1*b* of FIG. 1(*a*). FIG. 1(*c*) is a plan view of the back surface of phosphor wheel 100.

As shown in FIG. 1, phosphor wheel 100 is composed of disk-shaped metal substrate 110, phosphor film 120 circularly provided on the front surface (one surface) of substrate 110, light processing region 140 circularly provided on the back surface (the other surface) of substrate 110 and processing incident light, and motor 150 circumferentially rotating substrate 110. Here, motor 150 is an example of a drive device.

The rotation axis of motor 150 corresponds to the center of substrate 110. Substrate 110 and phosphor film 120 are concentrically provided.

Excitation light L1 enters one point inside phosphor film 120 shown in FIG. 1(*a*) from the front surface of phosphor wheel 100. Back-surface incident light L2 enters the back surface of the position entered by excitation light L1 from the back surface of phosphor wheel 100.

As shown in FIG. 1(*b*), phosphor film 120 is excited by excitation light L1 that has entered phosphor film 120 to emit fluorescence L11. Phosphor film 120 can be produced by bonding a ceramic phosphor to substrate 110 with an adhesive for example. Examples of a ceramic phosphor used for phosphor film 120 include YAG phosphor and LAG phosphor, which are cerium-activated garnet structure phosphors.

One phosphor wheel 100 may use one or more types of phosphor film 120. In this embodiment, phosphor wheel 100 is made of two types: red phosphor film 120R and green phosphor film 120G as shown in FIG. 1(*a*). FIG. 1(*b*) shows configuration 160*a* of the principal part of phosphor wheel 100. As shown in FIG. 1(b), red fluorescence of fluorescence L11 emitted when excitation light L1 has entered red phosphor film 120R is assumed to be red fluorescence L11R. Green fluorescence emitted when excitation light L1 has entered green phosphor film 120G is assumed to be green fluorescence L11G (unillustrated).

As shown in FIG. 1(a), substrate 110 of phosphor wheel 100 is provided with three regions circumferentially. There is red phosphor film 120R formed on the first region (angle region θR) in the front surface of substrate 110. There is green phosphor film 120G formed on the second region (angle region θG) in the front surface of substrate 110. Here, each of angle region θR and angle region θG is an example of a phosphor region. There is opening 130 formed in the third region (angle region θB) of substrate 110 so that excitation light L1 is transmitted when it has entered. Opening 130 is circularly provided in substrate 110 so as to be disposed on the same circumference as that of phosphor film 120. Here, angle region θB where opening 130 is provided is an example of a light-transmissive region.

As shown in FIG. 1(c), there is light processing region 140 for processing incident light provided in the back surface of phosphor film 120 (refer to FIG. 1(a)) of angle regions θR and θG of substrate 110 of phosphor wheel 100. Light processing region 140 has light absorption layer 140a as a light processing body on substrate 110.

As shown in FIG. 1(b), back-surface incident light L2, when entering light absorption layer 140a, is absorbed, which does not substantially cause reflected light. Light absorption layer 140a can be produced by the following process for example. That is, a metal plate with a coat of black anodized aluminum is fixed on the back side of substrate 110. Alternatively, a heat-resistant, black coloring agent is applied on the back surface of substrate 110.

Second Exemplary Embodiment

Phosphor Wheel

Hereinafter, a description is made of the configuration of a phosphor wheel according to this embodiment using FIGS. 1 and 2.

Figure 2:
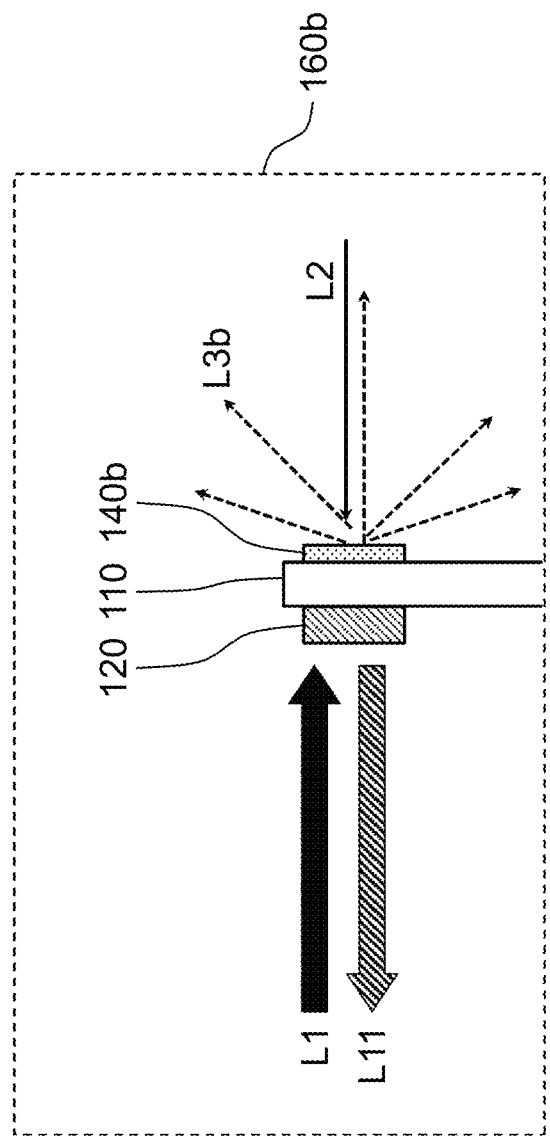
FIG. 2 illustrates the configuration of a phosphor wheel according to the second exemplary embodiment.

FIG. 2 illustrates configuration 160b of the principal part according to the embodiment, of phosphor wheel 100. In the embodiment, the configuration of light processing region 140 provided on the back surface of substrate 110 is different from that of phosphor wheel 100 of the first embodiment; the others are the same as those of the first embodiment, and thus their descriptions are omitted.

In the embodiment, phosphor wheel 100 has light diffusion layer 140b (refer to FIG. 2) that diffuse-reflects light that has entered as a light processing body in light processing region 140 (refer to FIG. 1), instead of light absorption layer 140a (refer to FIG. 1).

As shown in FIG. 2, when back-surface incident light L2 enters light diffusion layer 140b, back-surface reflected light L3b is emitted from the back surface. The diffusion angle of back-surface reflected light L3b is desirably as large as possible.

Light diffusion layer 140b can be produced as well either by forming a light diffusion film on the back surface of substrate 110 or by fixing a glass plate with a light diffusion film to the back surface of substrate 110 for example.

Third Exemplary Embodiment

Phosphor Wheel

Hereinafter, a description is made of the configuration according to this embodiment of, a phosphor wheel using FIGS. 1 and 3.

Figure 3:
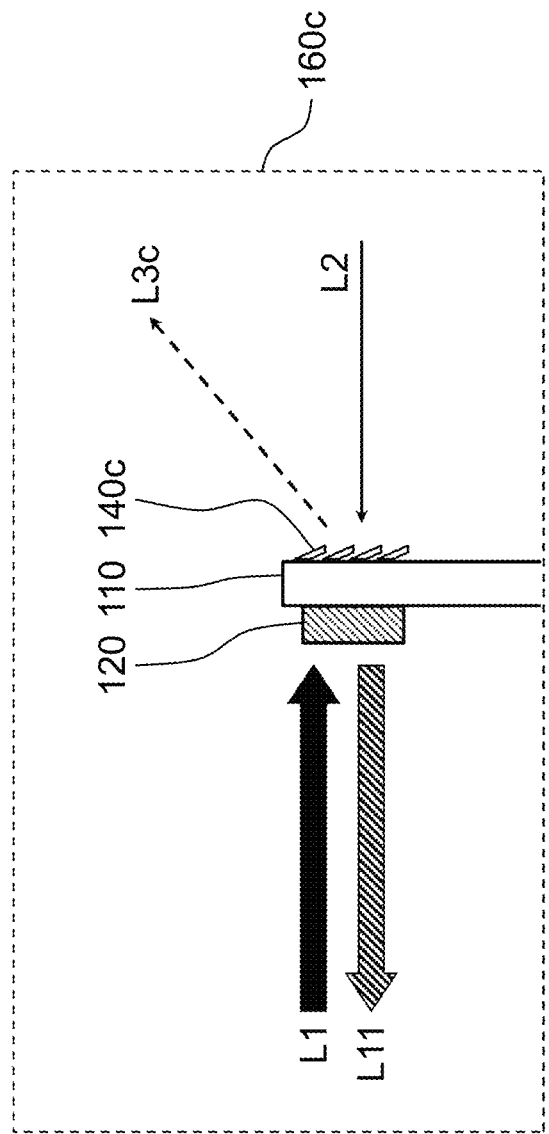
FIG. 3 illustrates the configuration of a phosphor wheel according to the third exemplary embodiment.

FIG. 3 illustrates configuration 160c of the principal part according to the embodiment, of phosphor wheel 100. In the embodiment, the configuration of light processing region 140 provided on the back surface of substrate 110 is different from that of phosphor wheel 100 of the first embodiment; the others are the same as those of the first embodiment, and thus their descriptions are omitted.

In this embodiment, phosphor wheel 100 has light reflection fin 140c (refer to FIG. 3) disposed with inclination relative to the surface of substrate 110 as a light processing body in light processing region 140 (refer to FIG. 1), instead of light absorption layer 140a (refer to FIG. 1). Here, light reflection fin 140c is an example of a light reflection layer disposed with inclination.

As shown in FIG. 3, when back-surface incident light L2 enters light reflection fin 140c, back-surface reflected light L3c is emitted from the back surface. Light reflection fin 140c is inclined relative to substrate 110 so that the optical axes of back-surface incident light L2 and back-surface reflected light L3c do not agree with each other. For example, light reflection fin 140c is disposed with an inclination of 20 degrees relative to the back surface of substrate 110 so that the optical axis of back-surface incident light L2 is vertical to substrate 110 and the angle formed by the axes of back-surface incident light L2 and back-surface reflected light L3c is 40 degrees. There may be either one or more light reflection fins 140c.

Light reflection fin 140c can be produced as well either by integrally molding substrate 110 with a bumpy back surface or by fixing a bent metal plate to the back surface of substrate 110 for example.

Fourth Exemplary Embodiment

Phosphor Wheel

Hereinafter, a description is made of the configuration according to this embodiment of a phosphor wheel using FIGS. 1 and 4.

Figure 4:
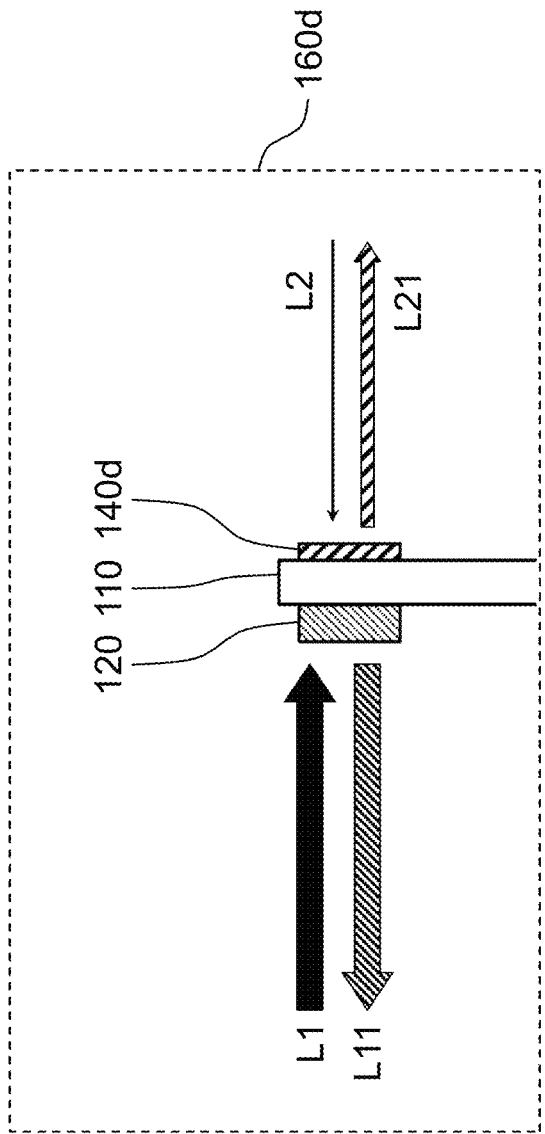
FIG. 4 illustrates the configuration of a phosphor wheel according to the fourth exemplary embodiment.

FIG. 4 illustrates configuration 160d of the principal part according to the embodiment, of phosphor wheel 100. In the embodiment, the configuration of light processing region 140 provided on the back surface of substrate 110 is different from that of phosphor wheel 100 of the first embodiment; the others are the same as those of the first embodiment, and thus their descriptions are omitted.

In this embodiment, phosphor wheel 100 has phosphor film 140d (refer to FIG. 4) that emits light with a wavelength different from that of light that enters as a light processing body in light processing region 140 (refer to FIG. 1), instead of light absorption layer 140a (refer to FIG. 1).

As shown in FIG. 4, when back-surface incident light L2 enters phosphor film 140d, phosphor film 140d is excited by back-surface incident light L2 to emit fluorescence L21 excited by back-surface incident light L2. Here, fluorescence L21 is light with a wavelength different from that of light that enters phosphor film 140d, and any wavelength may be used as long as it is different from that of back-surface incident light L2.

Phosphor film 140d can be produced as well by bonding a phosphor to the back surface of substrate 110 with an adhesive for example in the same way as phosphor film 120 described above.

Fifth Exemplary Embodiment

Light Source Device

Hereinafter, a description is made of the configuration according to this embodiment, of a light source device using FIGS. 1, 2, 3, 5A, and 5B.

FIGS. 5A and 5B illustrate the configuration according to the embodiment, of light source device 500. In more detail, FIG. 5A illustrates a state where excitation light is exciting phosphor film 120. FIG. 5B illustrates a state where excitation light is passing through opening 130. The embodiment exemplifies a case where light source device 500 eventually emits red, green, and blue light successively following the rotation of phosphor wheel 100.

As shown in FIGS. 5A and 5B, light source device 500 includes light source unit 510; diffusion plate 523; dichroic mirror 531; phosphor wheel 100, rod integrator 550; lenses 521, 522, 532, 533, 534, 541, 542, 544, 546, and 548; and mirrors 543, 545, and 547.

In this embodiment, light source device 500 incorporates phosphor wheel 100 according to one of the embodiments first to third. Phosphor wheel 100 is placed so that the front surface with phosphor film 120 (refer to FIG. 1) formed thereon faces lens 533 (refer to FIGS. 5A and 5B) and the back surface with light processing region 140 (refer to FIG. 1) provided thereon faces lens 541 (refer to FIGS. 5A and 5B). Then, phosphor wheel 100 is rotating in the direction of the arrow in FIG. 1(a).

Light source unit 510 is composed of multiple solid light sources such as a laser diode (LD: laser diode) and an LED (LED: light emitting diode); and multiple collimator lenses. In this embodiment, laser diode 511 emitting blue light is used as a solid light source. Light emitted from laser diodes 511 is collimated by collimator lenses 512 each disposed at the emitting sides of laser diodes 511.

The wavelength of blue light L50 emitted from light source unit 510 is 455 nm for example. Here, light source unit 510 is an example of an excitation light source.

Blue light L50 emitted from light source unit 510 passes through lens 521, lens 522, and diffusion plate 523 to enter dichroic mirror 531.

Dichroic mirror 531 is produced to have characteristics that transmit blue light and reflect light of the other colors. Actually, however, the transmittance of dichroic mirror 531 for blue light is not 100%; some of it is reflected. In this embodiment, most of blue light L50 that has entered dichroic mirror 531 passes through dichroic mirror 531 and heads to the front surface of phosphor wheel 100 as excitation light L1. Meanwhile, part of blue light L50 that has entered dichroic mirror 531 is reflected on dichroic mirror 531 and heads to the back surface of phosphor wheel 100 as back-surface incident light L2. In other words, blue light L50 branches to excitation light L1 and back-surface incident light L2 by means of dichroic mirror 531.

First, a description is made of the optical path of excitation light L1.

Excitation light L1 is collected by lenses 532 and 533 and enters the front surface of phosphor wheel 100. At this time, excitation light L1, following the rotation of phosphor wheel 100, enters red phosphor film 120R in angle region θR, green phosphor film 120G in angle region θG, and opening 130 in angle region θB in this sequence, shown in FIG. 1(a).

When excitation light L1 enters phosphor film 120, fluorescence L11 (red fluorescence L11R, green fluorescence L11G) is emitted as shown in FIG. 5A. Fluorescence L11 that has been emitted from the front surface of phosphor wheel 100 passes through lens 533 and lens 532 in sequence, is reflected on dichroic mirror 531, passes through lens 534, and then enters rod integrator 550. Subsequently, fluorescence L11 is uniformized in rod integrator 550 and is emitted from the surface opposite to the surface that fluorescence L11 has entered. In this embodiment, rod integrator 550 is a solid rod made of a transparent material such as glass.

When entering opening 130, excitation light L1 enters lens 541 as shown in FIG. 5B. Subsequently, excitation light L1 travels through lens 542, mirror 543, lens 544, mirror 545, lens 546, mirror 547, and lens 548 in sequence, and then enters dichroic mirror 531. Next, excitation light L1 passes through dichroic mirror 531, passes through lens 534 with its optical path and direction same as those of fluorescence L11 in FIG. 5A, and then enters rod integrator 550. Subsequently, excitation light L1 is uniformized in rod integrator 550, and is emitted from the surface opposite to the surface that excitation light L1 has entered.

Here, a relay optical system is configured of dichroic mirror 531, lens 541, lens 542, mirror 543, lens 544, mirror 545, lens 546, mirror 547, and lens 548. This relay optical system is an example of a light guide optical system that guides light from an excitation light source to phosphor wheel 100 and to given one surface with the optical path and direction same as those of fluorescence from the phosphor region of phosphor wheel 100 and of light that has passed through the light transmitting part of phosphor wheel 100. The incident surface of rod integrator 550 is an example of given one surface.

Next, a description is made of the optical path of back-surface incident light L2.

Back-surface incident light L2 travels through lens 548, mirror 547, lens 546, mirror 545, lens 544, mirror 543, lens 542, and lens 541 in sequence, and then enters the back surface of phosphor wheel 100. At this time, back-surface incident light L2, following the rotation of phosphor wheel 100, enters light processing region 140 in angle region θR, light processing region 140 in angle region θG, and opening 130 in angle region θB in this sequence, shown in FIG. 1(c).

When back-surface incident light L2 enters light processing region 140, if the back surface itself of substrate 110 is exposed as a result that light processing region 140 is not applied with a light processing body, part of reflected light that is back-surface incident light L2 reflected on the back surface enters lens 541 as back-surface reflected light L3. Back-surface reflected light L3 travels through lens 542, mirror 543, lens 544, mirror 545, lens 546, mirror 547, and lens 548 in sequence, and then enters dichroic mirror 531. Next, back-surface reflected light L3 passes through dichroic mirror 531, passes through lens 534, and then enters rod integrator 550. Subsequently, back-surface reflected light L3 is uniformized in rod integrator 550, and then is emitted from the surface opposite to the surface that back-surface reflected light L3 has entered.

Here, as shown in FIG. 1, light processing region 140 is disposed on the back surface of the region where phosphor films 120 in angle region θR and angle region θG of phosphor wheel 100 are formed. Accordingly, the following two actions occur simultaneously. One is that back-surface incident light L2 enters the back surface of phosphor wheel 100 and back-surface reflected light L3 is emitted in light source device 500. The other is that excitation light L1 enters phosphor film 120 on the front surface of phosphor wheel 100 and fluorescence L11 (red fluorescence L11R, green fluorescence L11G) are emitted. Hence, back-surface reflected light L3 enters rod integrator 550 simultaneously with fluorescence L11, to cause mixture of colors. At this moment, a higher optical intensity of back-surface reflected light L3 leads to a lower color purity of red light (red fluorescence L11R) and green light (green fluorescence L11G) emitted from light source device 500.

However, phosphor wheel 100 provided with light processing region 140 including any one of the light processing bodies described in the embodiments first to third reduces the optical intensity of back-surface reflected light L3 that enters lens 541 and is emitted from rod integrator 550.

Light source device 500 incorporating phosphor wheel 100 of the first embodiment is to change configuration 160 of part of phosphor wheel 100 shown in FIGS. 5A and 5B to configuration 160a shown in FIG. 1(b). Thus, light processing region 140 has light absorption layer 140a, which does not cause back-surface reflected light L3 substantially. This prevents blue light from being mixed into fluorescence, which allows emitting colors with high color purity to be emitted.

Light source device 500 incorporating phosphor wheel 100 of the second embodiment is to change configuration 160 of part of phosphor wheel 100 shown in FIGS. 5A and 5B to configuration 160b shown in FIG. 2. Thus, light processing region 140 has light diffusion layer 140b. Reflected light thus generated becomes back-surface reflected light L3b, which spreads to a large degree. As a result, most of reflected light L3b passes through outside the effective diameter of lens 541; only small part of it enters lens 541. This prevents blue light from being mixed into fluorescence, which allows emitting colors with high color purity to be emitted.

Light source device 500 incorporating phosphor wheel 100 of the third embodiment is to change configuration 160 of part of phosphor wheel 100 shown in FIGS. 5A and 5B to configuration 160c shown in FIG. 3. Thus, light processing region 140 has light reflection fin 140c. This increases the angle formed by the optical axis of back-surface reflected light L3c generated and the optical axis (the central axis of lens 541) of back-surface incident light L2. As a result, most of reflected light L3c passes through outside the effective diameter of lens 541; no part of it enters lens 541. This prevents blue light from being mixed into fluorescence, which allows emitting colors with high color purity to be emitted.

Sixth Exemplary Embodiment

Light Source Device

Hereinafter, a description is made of the configuration according to this embodiment, of a light source device using FIGS. 1, 4, 5A, 5B, and 6.

Figure 6:
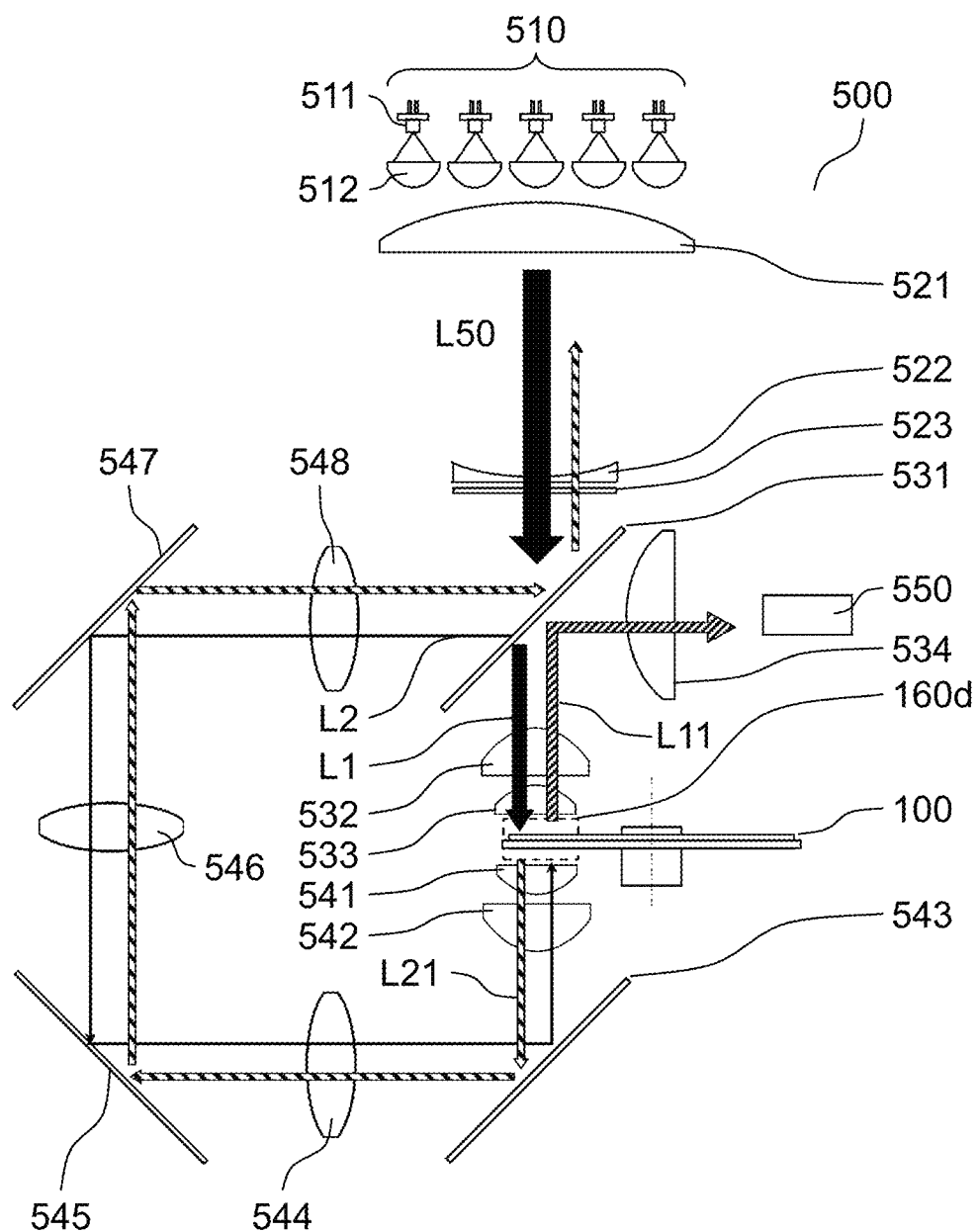
FIG. 6 illustrates the configuration of a light source device according to the sixth exemplary embodiment.

FIG. 6 illustrates the configuration according to the embodiment, of light source device 500. The embodiment exemplifies a case where light source device 500 eventually emits red, green, and blue light successively following the rotation of phosphor wheel 100.

In this embodiment, light source device 500 incorporates phosphor wheel 100 (refer to FIG. 4) according to the fourth embodiment. The other components are the same as those of the fifth embodiment (refer to FIGS. 5A and 5B), and thus their duplicate descriptions are omitted.

As shown in FIG. 4, when entering light processing region 140, blue back-surface incident light L2 undergoes conversion of its wavelength by phosphor film 140d to become fluorescence L21. As shown in FIG. 6, fluorescence L21 that has entered lens 541 travels through lens 542, mirror 543, lens 544, mirror 545, lens 546, mirror 547, and lens 548 in sequence, and then enters dichroic mirror 531. Next, fluorescence L21 is reflected on dichroic mirror 531 to head to light source unit 510. That is, fluorescence L21 has a wavelength different from that of blue back-surface incident light L2 that has undergone conversion of its wavelength by phosphor film 140d, where it is only required that the wavelength is that of light reflected on dichroic mirror 531.

Hence, there is no blue light that enters rod integrator 550 simultaneously with fluorescence L11. This prevents blue light from being mixed into fluorescence, which allows emitting colors with high color purity to be emitted.

Seventh Exemplary Embodiment

Projection Display Apparatus

Hereinafter, a description is made of the configuration of a projection display apparatus according to this embodiment using FIG. 7.

Figure 7:
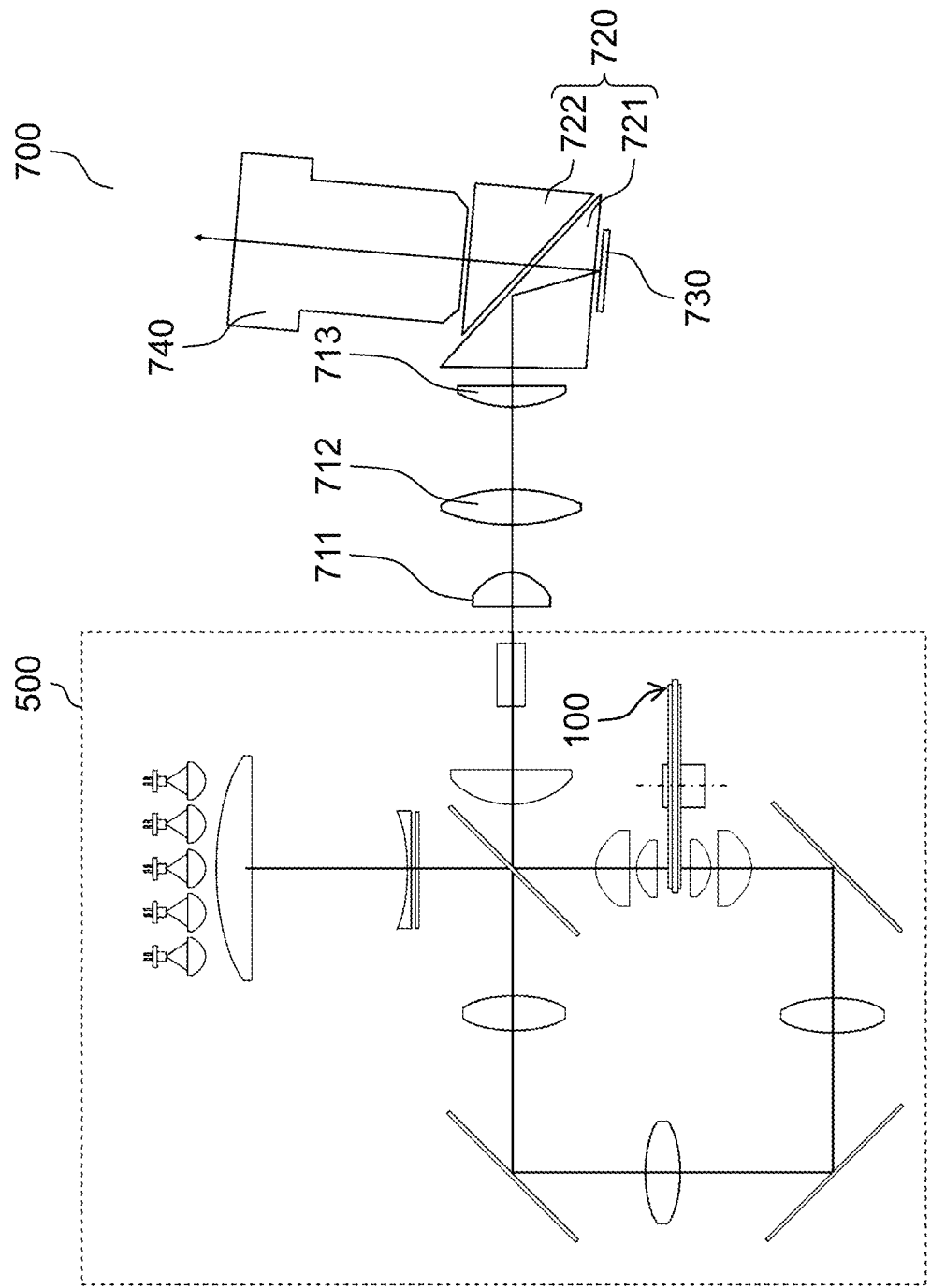
FIG. 7 illustrates the configuration of a projection display apparatus according to the seventh exemplary embodiment.

FIG. 7 illustrates the configuration of projection display apparatus 700 according to the embodiment. The embodiment exemplifies a case where projection display apparatus 700 emits red, green, and blue light successively as image light following the rotation of phosphor wheel 100.

As shown in FIG. 7, projection display apparatus 700 includes light source device 500, digital micro-mirror device (DMD) 730, total reflection prism 720, projection lens 740, and some other lenses.

In this embodiment, projection display apparatus 700 incorporates light source device 500 according to either the fifth or sixth embodiment.

Light source device 500 successively emits red, green, and blue light, each uniformized and having high color purity. As shown in FIG. 7, they are propagated through lens 711, lens 712, lens 713, and triangular prism 721 as total reflection prism 720, and then enter DMD 730.

In this embodiment, projection display apparatus 700 incorporates one DMD, which is DMD 730. DMD 730 is composed of some minute mirrors, which are movable. Each minute mirror basically corresponds to one pixel. DMD 730 changes the angle of each minute mirror in response to an image signal (modulating operation) to change whether or not light is reflected toward projection lens 740.

An image signal fed to DMD 730 is synchronized with the rotation of phosphor wheel 100, and DMD 730 expresses gradation of red, green, and blue light correspondingly to time when they successively enter DMD 730.

An image light generated by modulation by DMD 730 passes through triangular prisms 721 and 722 to enter projection lens 740. The image light that has entered projection lens 740 is enlarged/projected onto a screen (unillustrated).

Other Exemplary Embodiments

Hereinbefore, the description is made of the first through seventh embodiments for exemplification of the technologies in the disclosure. However, these technologies are not limited to the embodiments, but are also applicable to embodiments that have undergone change, substitution, addition, and/or omission. Besides, some components described above can be combined to create a new embodiment.

Hereinafter, other embodiments are exemplified.

In the embodiments first to fourth, exemplification is made of a case where substrate 110 of phosphor wheel 100 is produced from metal and angle region θB is provided with opening 130. Otherwise, a case may be accepted where substrate 110 is made of a glass plate and angle region θB made of glass has an antireflection film formed on its surface.

In the fifth and sixth embodiments, dichroic mirror 531 of light source device 500 uses a material that transmits blue light and reflects other colors. Conversely, the following arrangement may be made. That is, dichroic mirror 531 uses a material that reflects blue light and transmits other colors, and accordingly the disposition of light source unit 510, lens 521, lens 522 and diffusion plate 523, and lens 534 and rod integrator 550 is appropriately changed.

In the fifth and sixth embodiments, rod integrator 550 of light source device 500 is a solid rod made of a transparent material such as glass. Otherwise, rod integrator 550 may be a hollow rod with its inner wall formed of mirror surfaces.

In the seventh embodiment, a projection display apparatus using one DMD is exemplified as projection display apparatus 700. Otherwise, image display device 700 may be a projection display apparatus using two DMDs. In this case, the following optical configuration can be made for example. That is, an appropriate color separation element is used to introduce red and blue light to one DMD and green light to the other DMD. Besides, an element that separates yellow light into red and green light simplifies phosphor film 120 of phosphor wheel 100 as a single yellow phosphor film.

INDUSTRIAL APPLICABILITY

The present disclosure is applicable to a projection display apparatus such as a projector.

What is claimed is:

1. A light source device comprising:
    an excitation light source configured to emit excitation light;
    a phosphor wheel comprising:
        a non-light-transmissive substrate;
        a phosphor region circularly provided on one surface of the substrate, the phosphor region being configured to be excited by the excitation light to emit fluorescence;
        a light processing region circularly provided on an other surface of the substrate at a portion corresponding to the phosphor region and entered by incident light;
        a light absorption body provided in the light processing region, the light absorption body being configured to absorb the excitation light and not emit absorbed light;
        a light-transmissive region provided in the substrate; and
    a drive device configured to rotate the substrate; and
    a light guide optical system configured to:
        guide a majority of the excitation light to the one surface of the substrate, thereby causing:
            the fluorescence emitted from the phosphor region and light, which is not wavelength-converted but passes through the light-transmissive region, of the majority of the excitation light to travel along a same optical path and in a same direction, and
        guide a remaining part of the excitation light to the other surface of the substrate of the phosphor wheel.

2. A projection display apparatus including the light source device of claim 1.

* * * * *